United States Patent
Nigam et al.

(10) Patent No.: US 10,728,777 B2
(45) Date of Patent: Jul. 28, 2020

(54) METHODS AND SYSTEMS FOR ENABLING CHANNEL MEASUREMENT OF UNLICENSED CARRIER IN CELLULAR ON UNLICENSED BAND SYSTEMS

(71) Applicant: Samsung Electronics Co., Ltd, Gyeonggi-do (KR)

(72) Inventors: Anshuman Nigam, Bangalore (IN); Anil Agiwal, Bangalore (IN); Jung-Soo Jung, Gyeonggi-do (KR); Ashok Kumar Reddy Chavva, Bangalore (IN); Nagacharan Udupi, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 15/519,813

(22) PCT Filed: Oct. 16, 2015

(86) PCT No.: PCT/KR2015/010987
§ 371 (c)(1),
(2) Date: Apr. 17, 2017

(87) PCT Pub. No.: WO2016/060523
PCT Pub. Date: Apr. 21, 2016

(65) Prior Publication Data
US 2017/0280341 A1    Sep. 28, 2017

Related U.S. Application Data

(60) Provisional application No. PCT/KR2015/010987, filed on Oct. 16, 2015.

(30) Foreign Application Priority Data

Oct. 17, 2014  (IN) ............................ 5216/CHE/2014
Oct. 14, 2015  (IN) ............................ 5216/CHE/2014

(51) Int. Cl.
*H04W 24/08*    (2009.01)
*H04W 24/10*    (2009.01)
(Continued)

(52) U.S. Cl.
CPC ........... *H04W 24/08* (2013.01); *H04L 5/0048* (2013.01); *H04L 5/0053* (2013.01);
(Continued)

(58) Field of Classification Search
CPC ..... H04W 24/08; H04W 88/06; H04W 16/14; H04W 24/10; H04L 5/0048; H04L 5/0053; H04L 5/0092
See application file for complete search history.

(56) References Cited

U.S. PATENT DOCUMENTS 5,606,727 A  *  2/1997  Ueda ................... H04W 72/082
                                                              455/513
2013/0301451 A1* 11/2013  Sionnina ............... H04W 24/00
                                                              370/252

(Continued)

FOREIGN PATENT DOCUMENTS

EP       2757850 A1    7/2014
WO    2005065198 A2    7/2005
(Continued)

OTHER PUBLICATIONS

Supplementary European Search Report dated Jul. 6, 2017 in connection with European Patent Application No. 15 85 0664.
(Continued)

*Primary Examiner* — Christopher M Crutchfield
*Assistant Examiner* — Tito Q Pham

(57) ABSTRACT

The present disclosure relates to a communication method and system for converging a $5^{th}$-Generation (5G) communication system for supporting higher data rates beyond a $4^{th}$-Generation (4G) system with a technology for Internet of
(Continued)

Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein disclose methods and systems for an unlicensed carrier to be added in LTE-U based communication networks by performing measurements for the unlicensed carrier as in legacy LTE for the addition of a licensed carrier, while ensuring that the UE knows when to measure the unlicensed channels.

6 Claims, 20 Drawing Sheets

(51) Int. Cl.
  *H04L 5/00* (2006.01)
  *H04W 16/14* (2009.01)
  *H04W 88/06* (2009.01)

(52) U.S. Cl.
  CPC ........... *H04L 5/0092* (2013.01); *H04W 16/14* (2013.01); *H04W 24/10* (2013.01); *H04W 88/06* (2013.01)

(56) References Cited

U.S. PATENT DOCUMENTS

| | | | | |
|---|---|---|---|---|
| 2013/0336156 A1* | 12/2013 | Wei | ............. | H04L 5/001 370/252 |
| 2014/0036881 A1* | 2/2014 | Kim | ............. | H04L 5/001 370/336 |
| 2015/0063151 A1* | 3/2015 | Sadek | ............. | H04W 24/08 370/252 |
| 2016/0066195 A1* | 3/2016 | Moon | ............. | H04W 16/14 455/454 |
| 2016/0205601 A1* | 7/2016 | Yiu | ............. | H04W 4/70 455/444 |
| 2016/0338019 A1* | 11/2016 | Ratasuk | ............. | H04L 5/001 |
| 2017/0085326 A1* | 3/2017 | Li | ............. | H04B 17/345 |
| 2017/0086214 A1* | 3/2017 | Kalhan | ............. | H04W 76/14 |
| 2017/0094681 A1* | 3/2017 | Takeda | ............. | H04W 16/14 |
| 2017/0208588 A1* | 7/2017 | Park | ............. | H04L 27/26 |
| 2018/0376479 A1* | 12/2018 | Kaur | ............. | H04L 5/001 |

FOREIGN PATENT DOCUMENTS

| | | |
|---|---|---|
| WO | 2012/116489 A1 | 9/2012 |
| WO | 2013/059999 A1 | 5/2013 |

OTHER PUBLICATIONS

Alcatel-Lucent et al., "Channel Selection for Licensed-Assisted Access", 3GPP TSG RAN WG1 Meeting #78bis, Oct. 6-10, 2014, 4 pages, R1-144082.

Rapeepat Ratasuk et al., "License-Exempt LTE Deployment in Heterogeneous Network", Aug. 28, 2012, 5 pages.

International Search Report dated Feb. 24, 2016 in connection with International Application No. PCT/KR2015/010987, 3 pages.

Written Opinion of the International Searching Authority dated Feb. 24, 2016 in connection with International Application No. PCT/KR2015/010987, 13 pages.

\* cited by examiner

[Fig. 1]
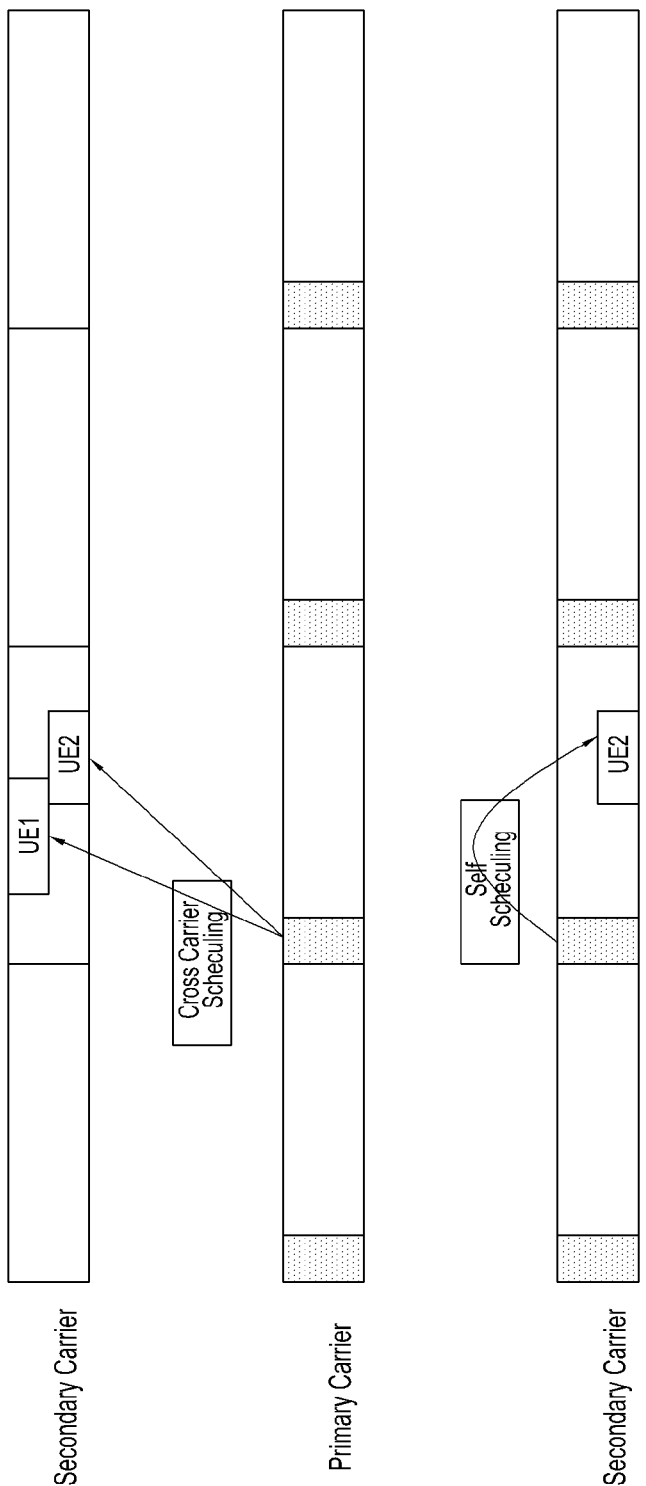

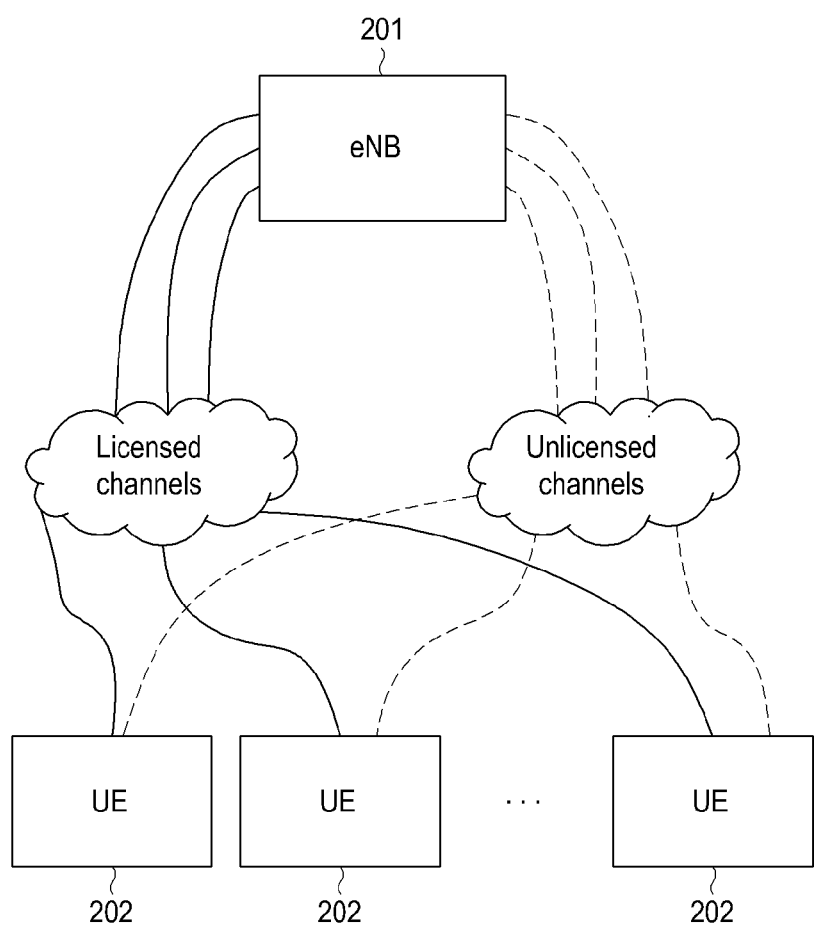
[Fig. 2]

[Fig. 3]
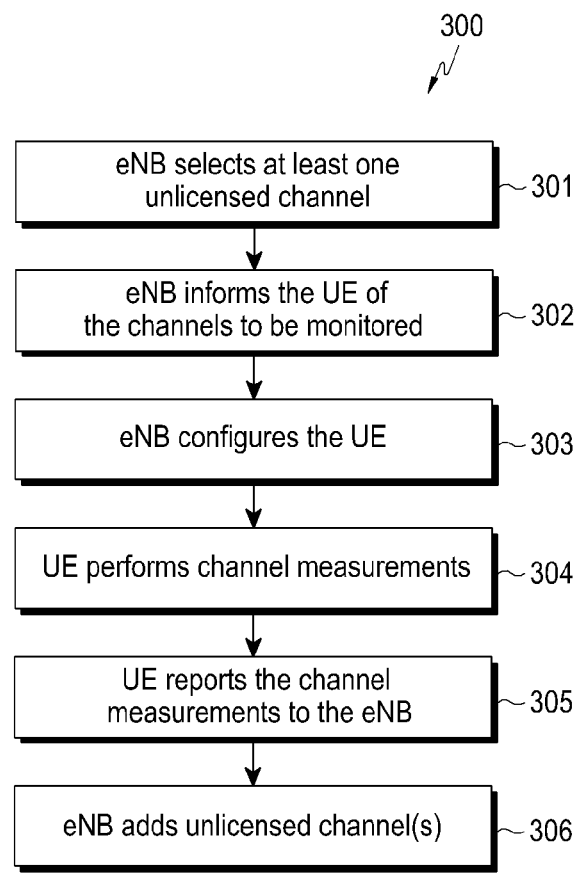

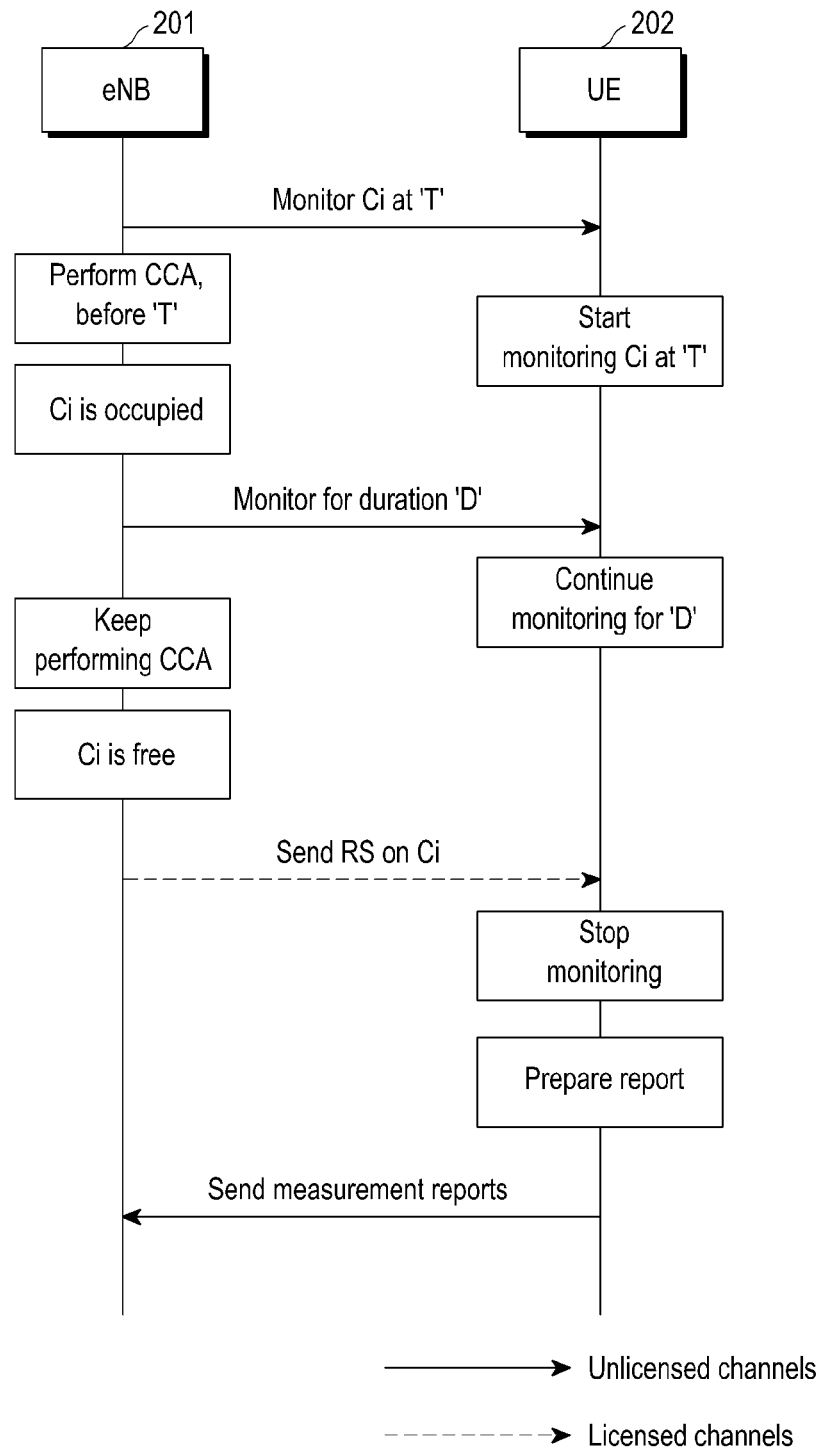
[Fig. 4]

[Fig. 5]
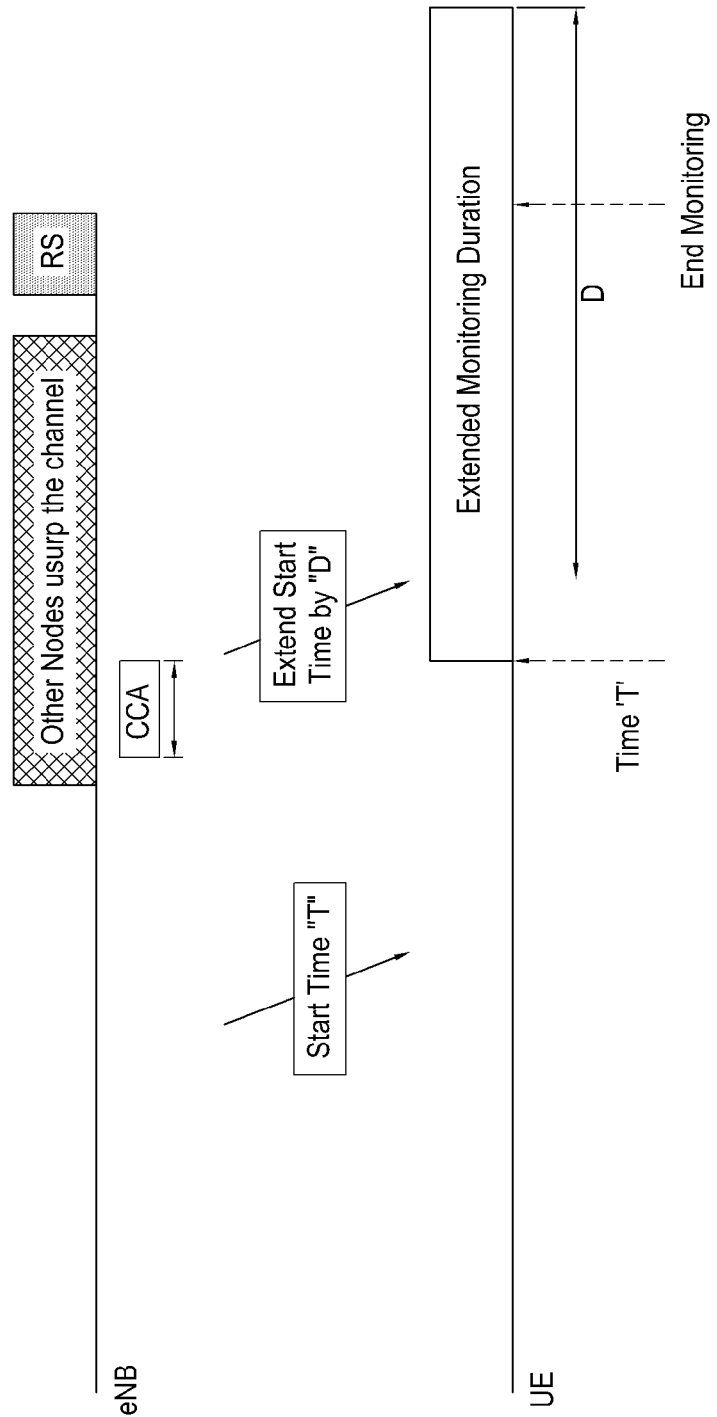

[Fig. 6]
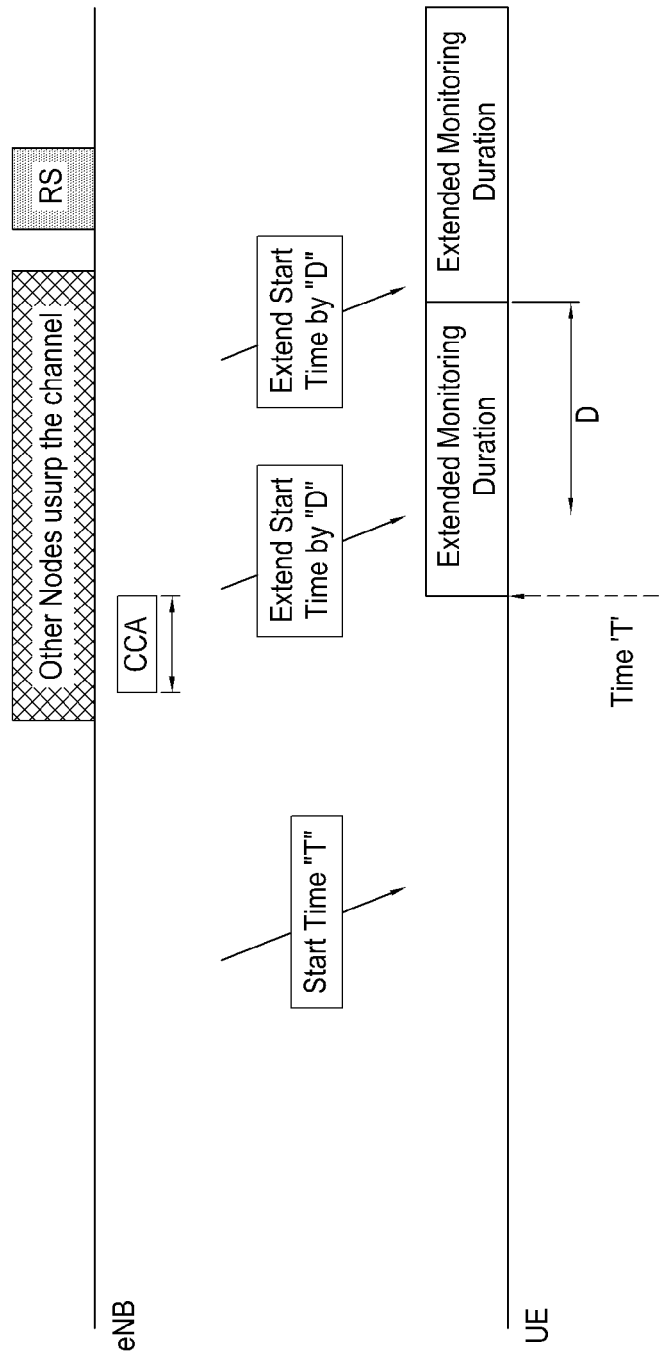

[Fig. 7]
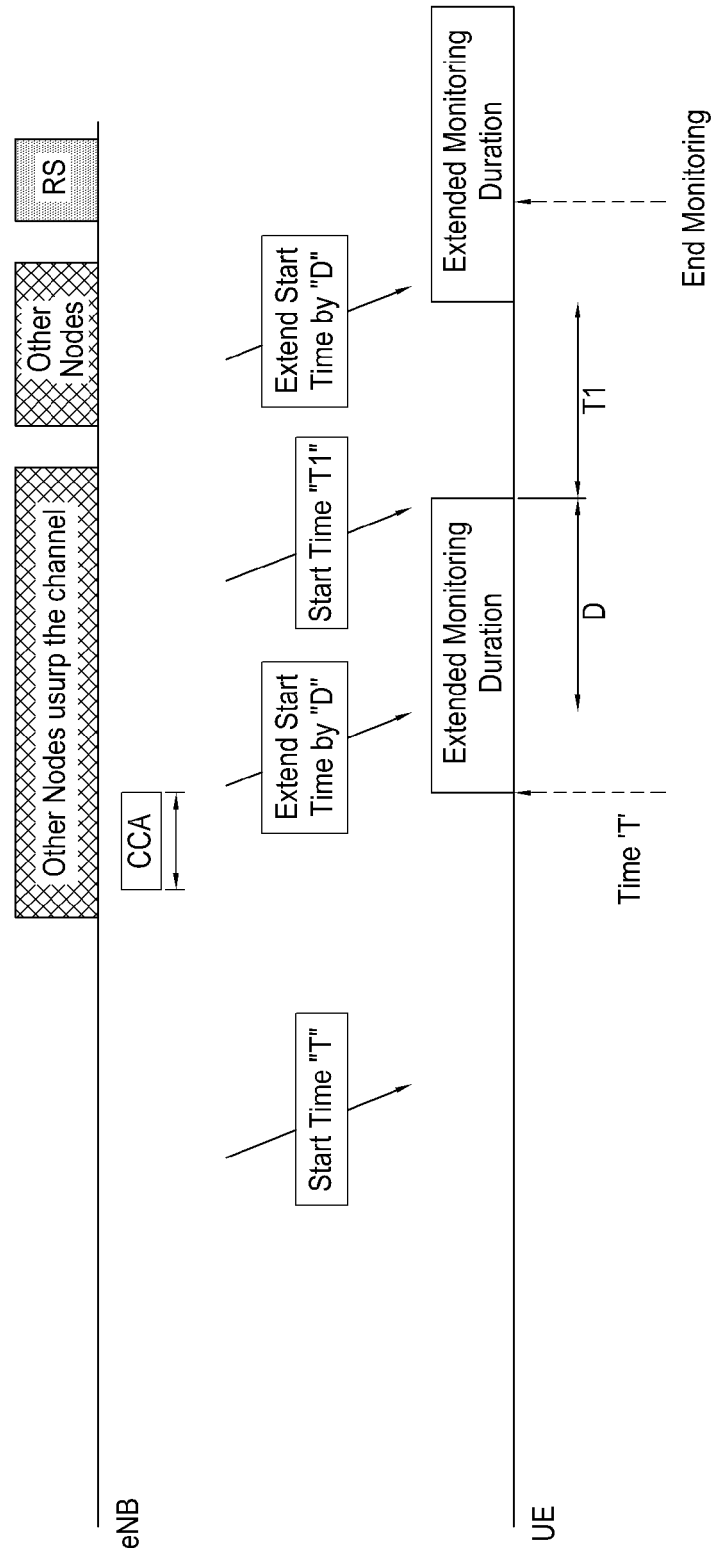

[Fig. 8]
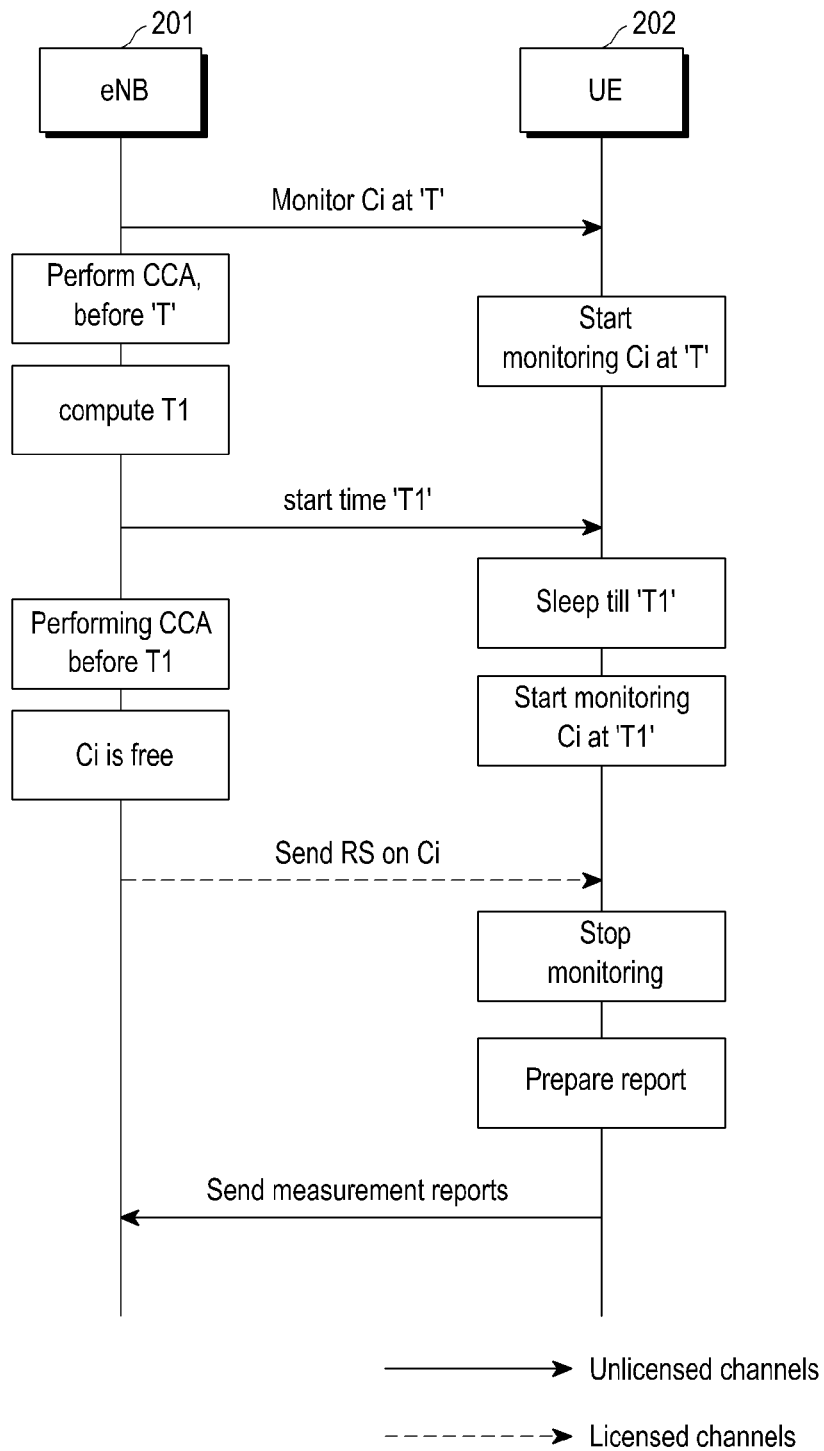

[Fig. 9]
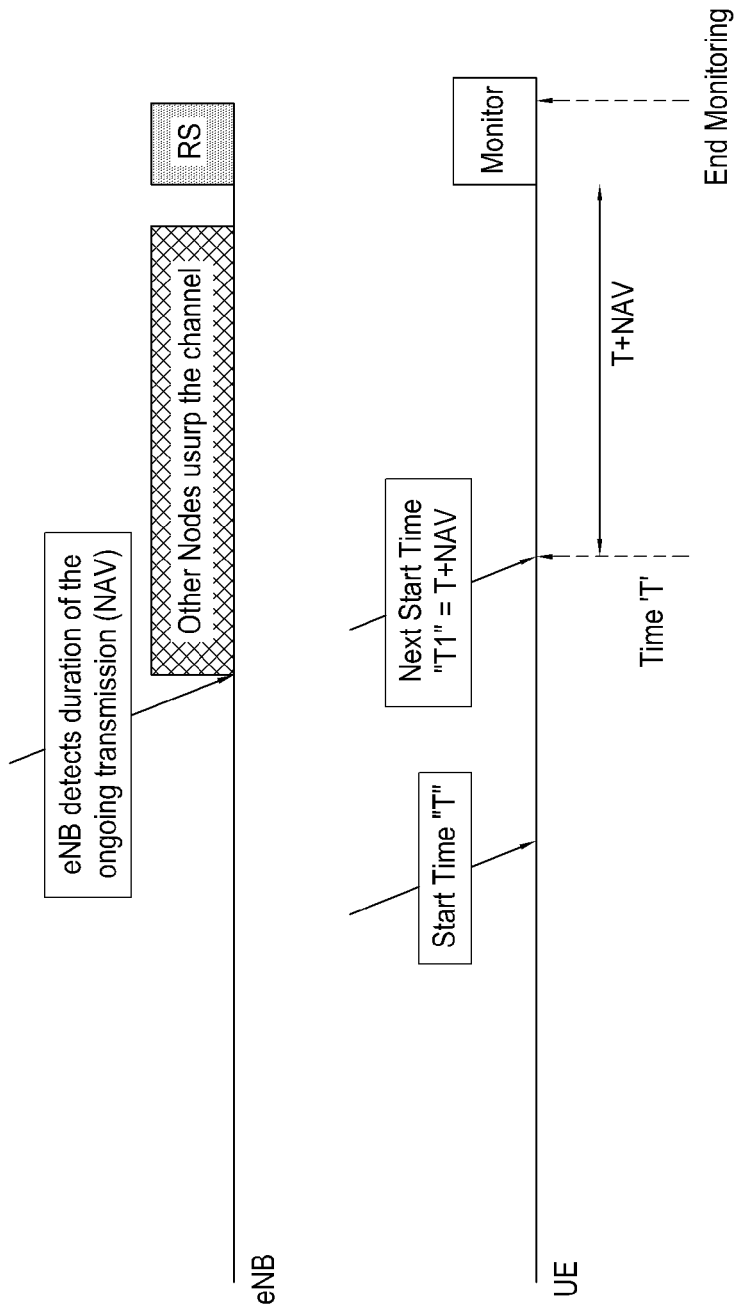

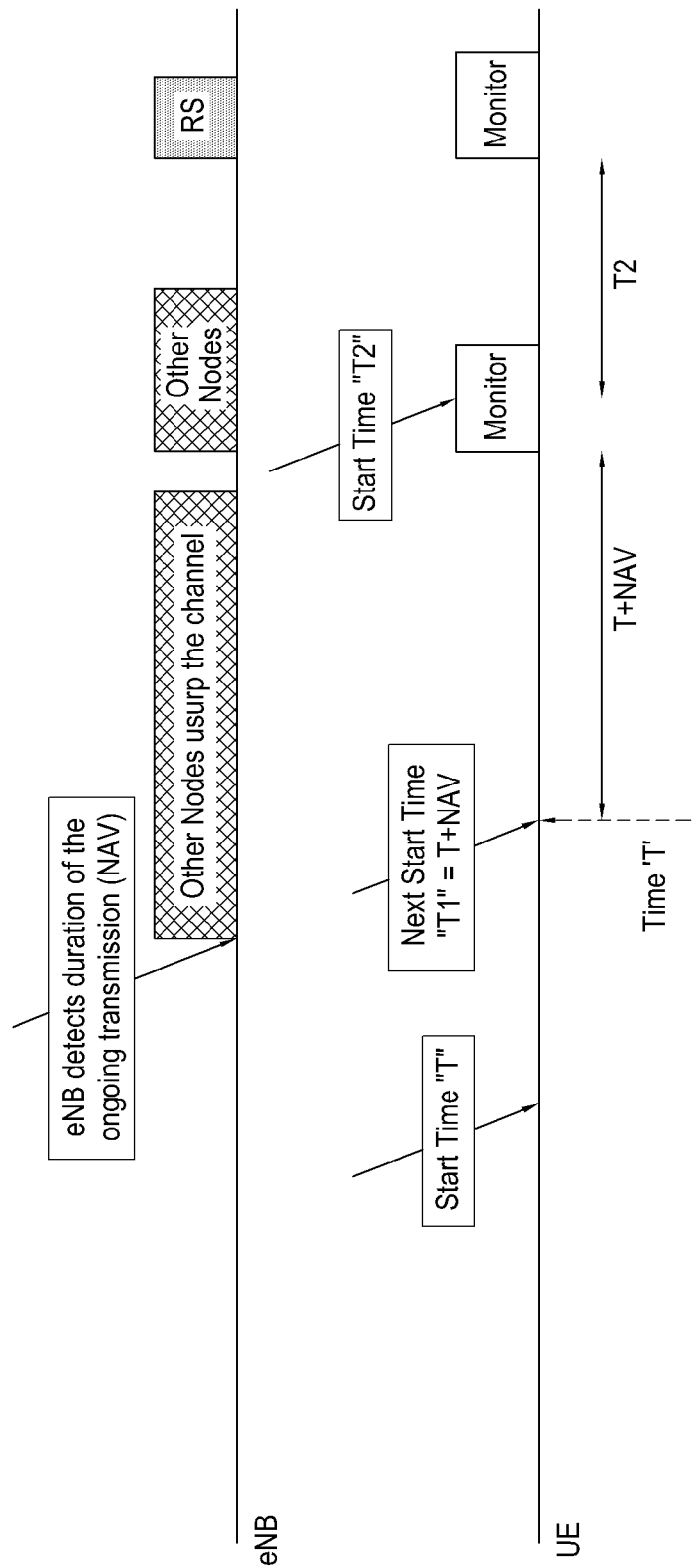
[Fig. 10]

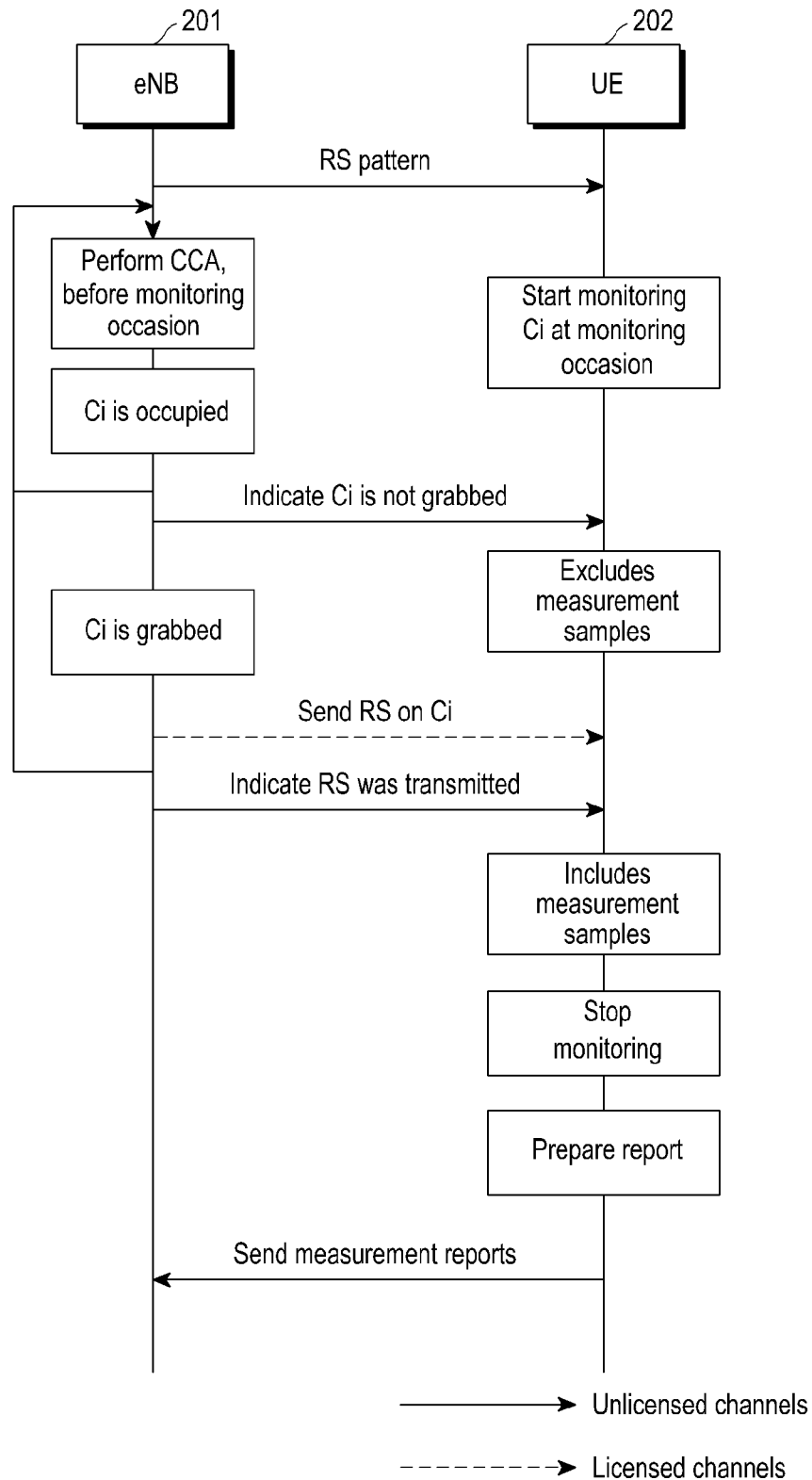
[Fig. 11]

[Fig. 12]
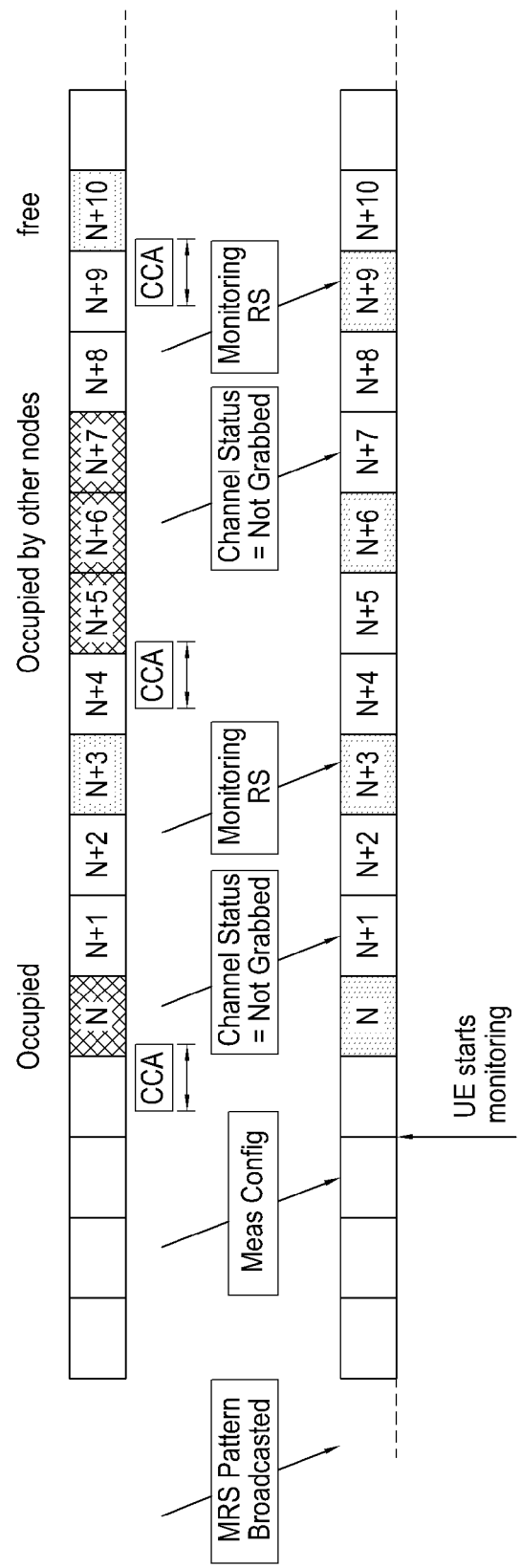

[Fig. 13]
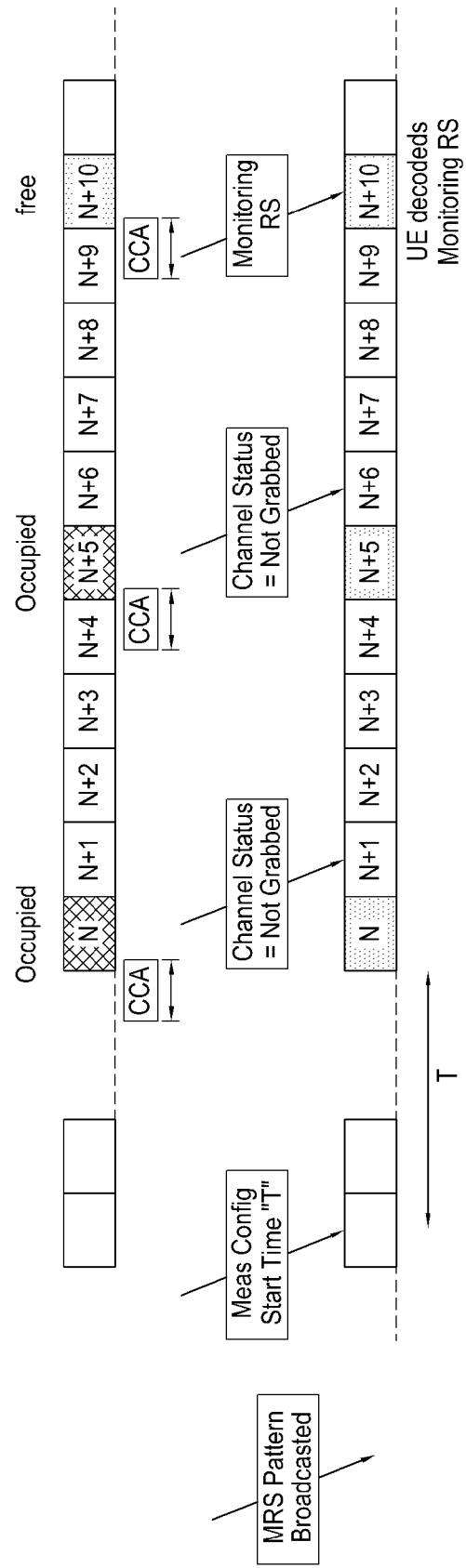

[Fig. 14]
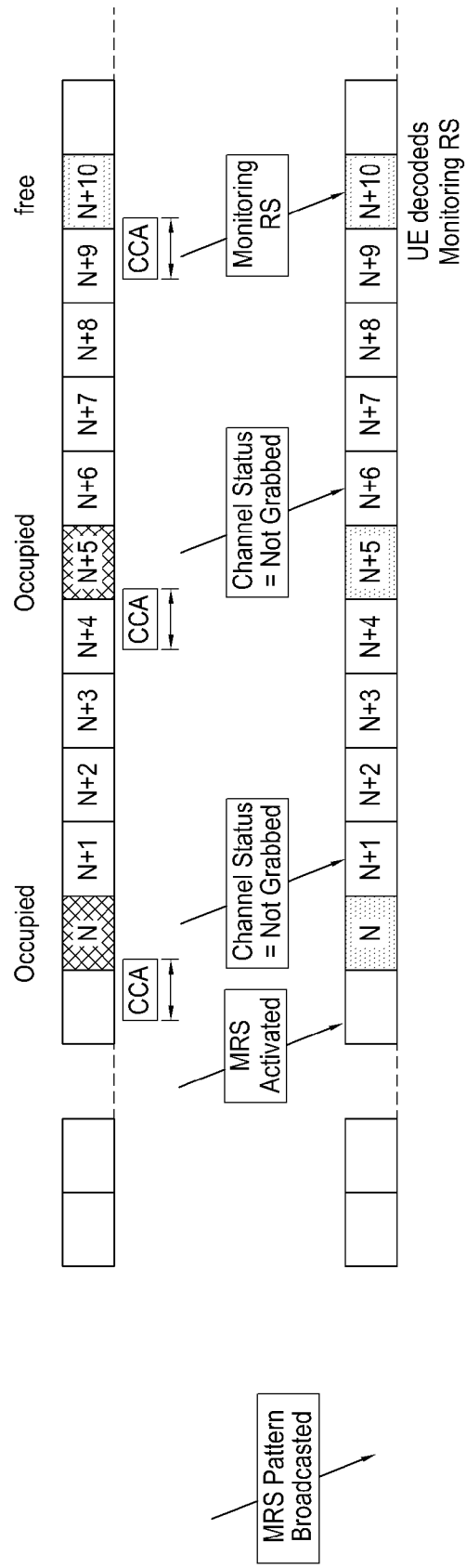

[Fig. 15]
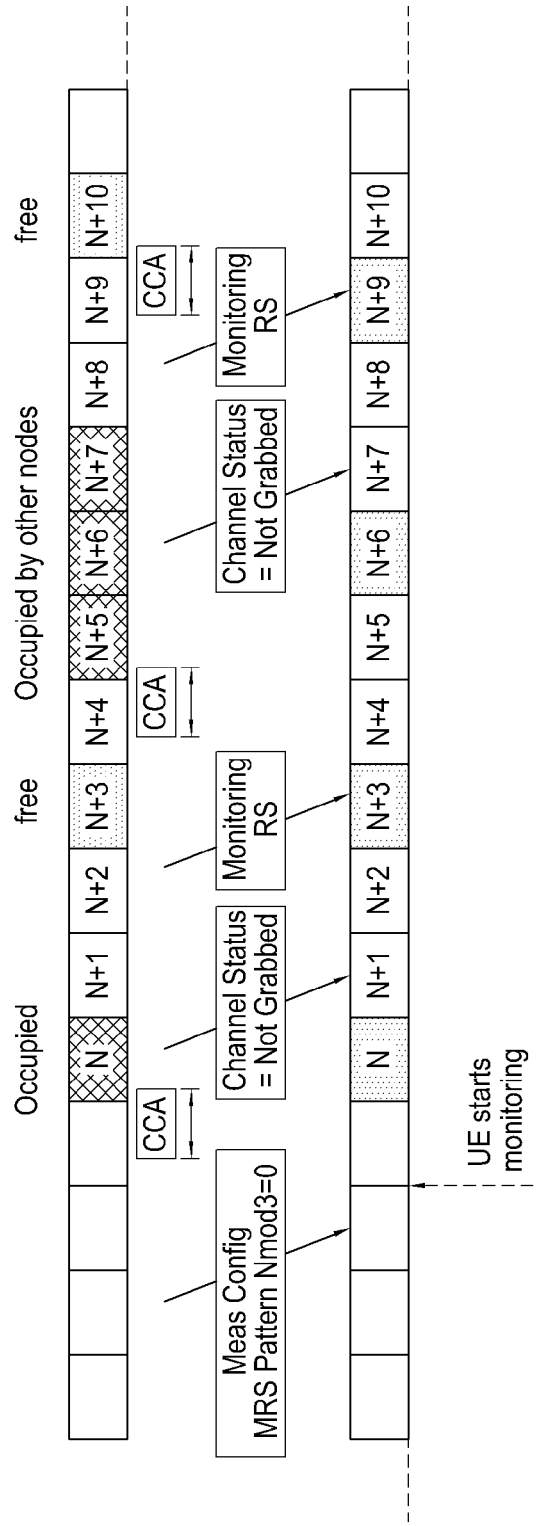

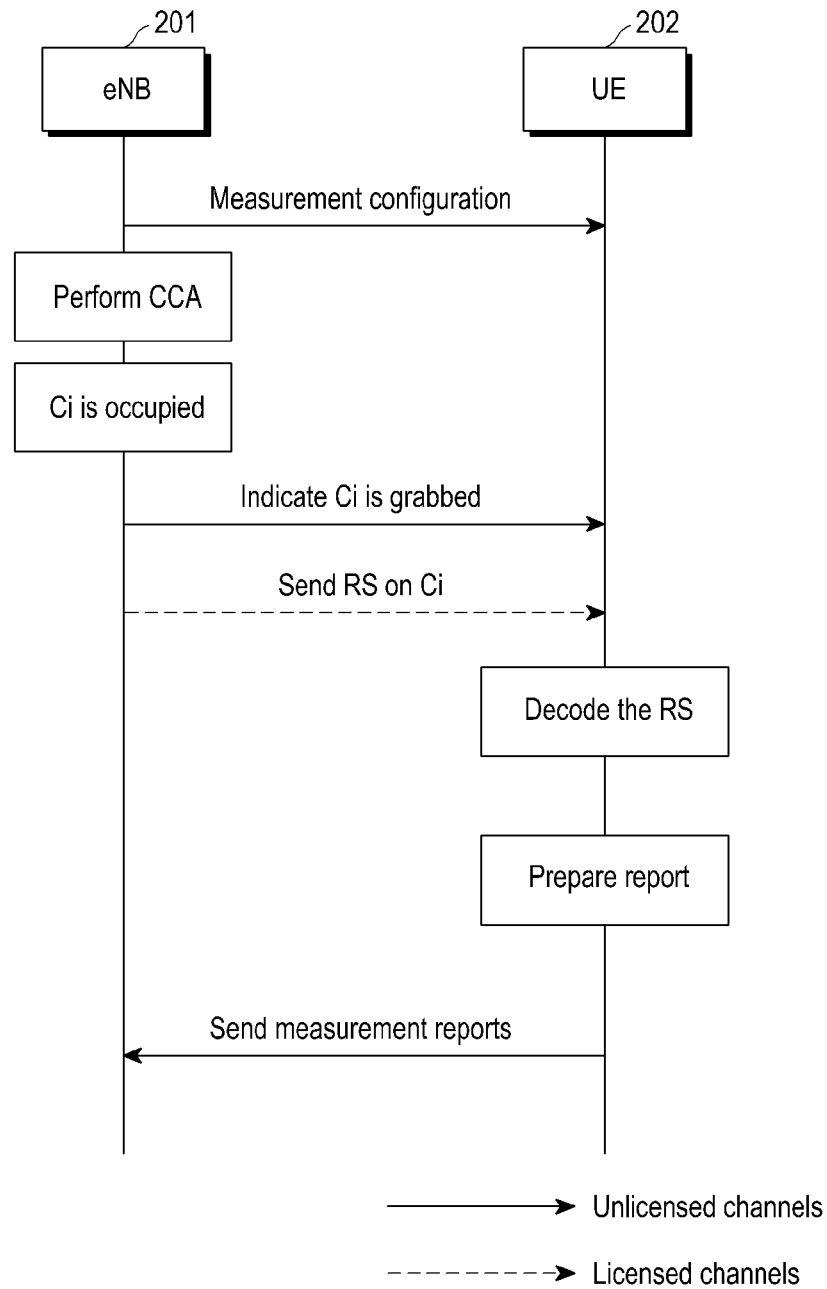
[Fig. 16]

[Fig. 17]
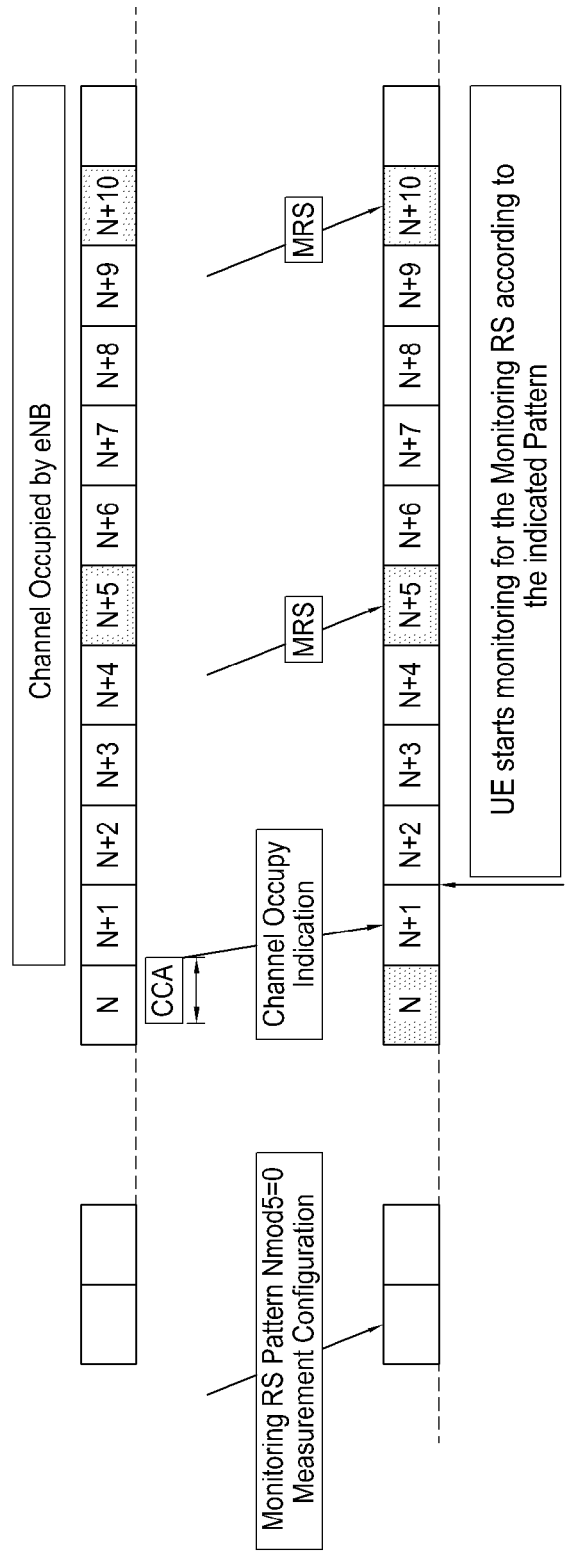

[Fig. 18]
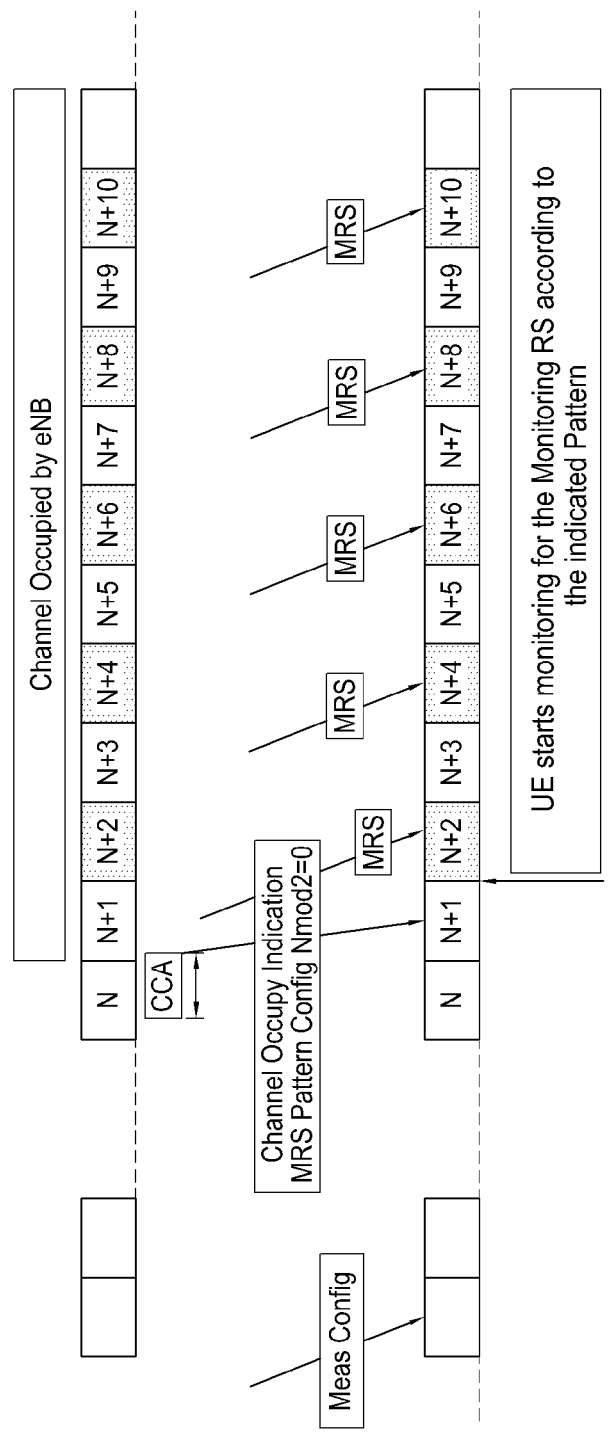

[Fig. 19]
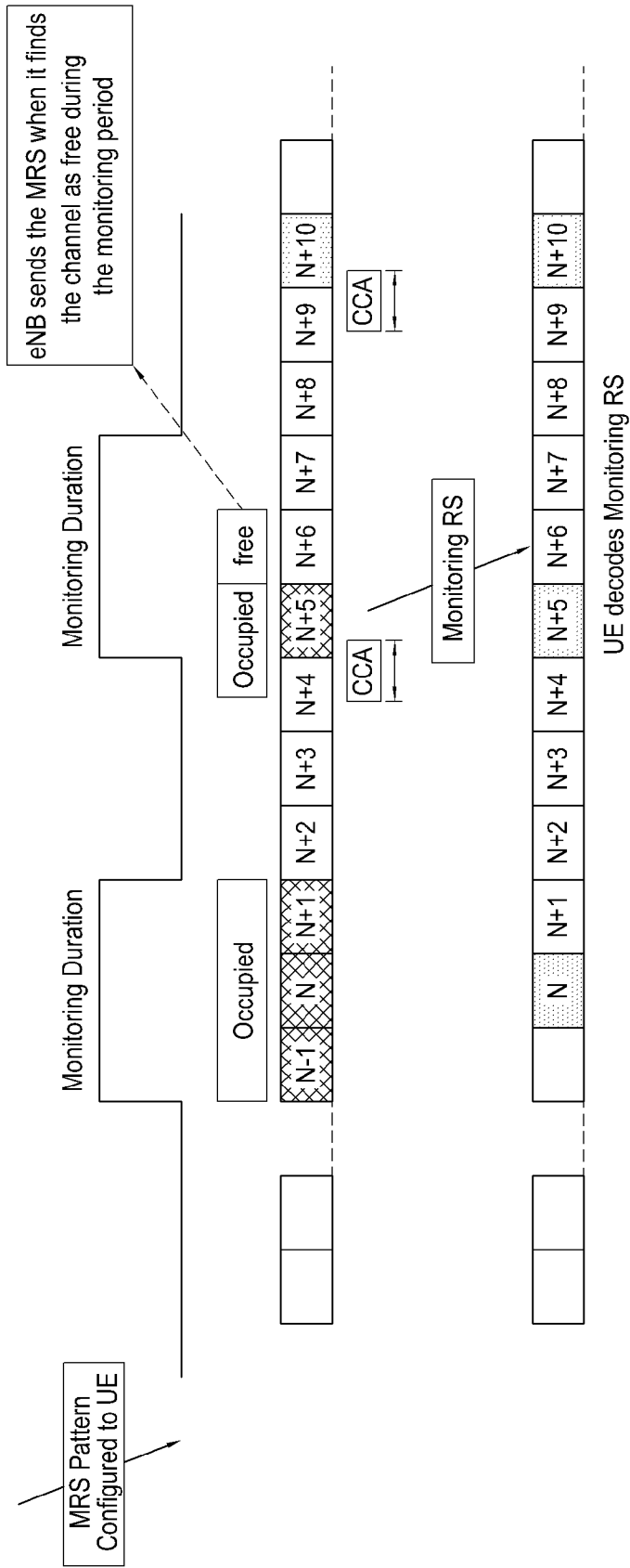

[Fig. 20]
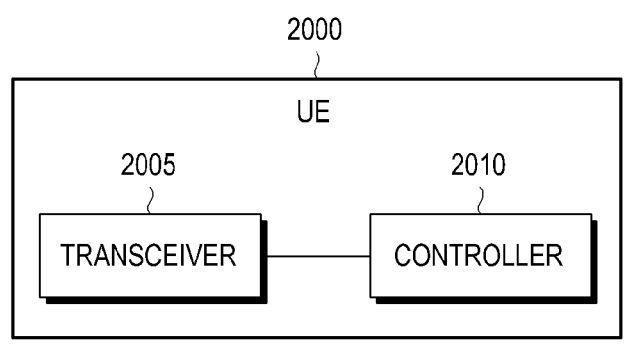
[Fig. 21]
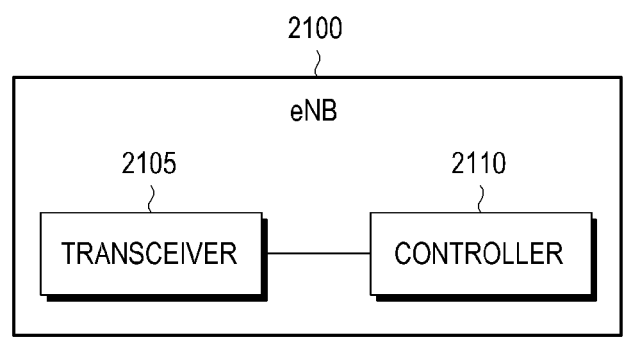

METHODS AND SYSTEMS FOR ENABLING CHANNEL MEASUREMENT OF UNLICENSED CARRIER IN CELLULAR ON UNLICENSED BAND SYSTEMS

CROSS-REFERENCE TO RELATED APPLICATION(S)

The present application claims priority under 35 U.S.C. § 365 to International Patent Application No. PCT/KR2015/010987 filed Oct. 16, 2015, entitled "METHODS AND SYSTEMS FOR ENABLING CHANNEL MEASUREMENT OF UNLICENSED CARRIER IN CELLULAR ON UNLICENSED BAND SYSTEMS", and, through International Patent Application No. PCT/KR2015/010987, to Indian Patent Application. No. 5216/CHE/2014, filed on Oct. 17, 2014, and to Indian patent application No. 521.6/CHE/2014, filed on Oct. 14, 2015, each of which are incorporated herein by reference into the present disclosure as if fully set forth herein.

TECHNICAL FIELD

The present disclosure relates to the field of cellular communication networks and more particularly to enabling operation of cellular communication networks over unlicensed spectrum.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The cellular industry typically operates over licensed spectrum, but the cellular industry is considering operating on unlicensed band in order to meet the surging traffic demands. The unlicensed band is free to be used by any technology, but is governed by few regulations (in most countries) like the requirement of "Listen Before Talk-LBT" which requires a transmitter on the unlicensed band to sense the channel for at least 20 microseconds and if the channel is found to be free (not used by other devices), then the transmitter is allowed to transmit on the unlicensed bands. Further the regulations allow for transmissions up to a maximum time limit and also provide means for giving fairness to the other devices/technologies. The unlicensed bands are typically dominated by Wi-Fi, Bluetooth, ZigBee, WiMAX and other technologies. 3GPP has already decided to customize LTE (Long Term Evolution) standards in the LTE Release 13 for operation on the unlicensed bands and to exist harmoniously with Wi-Fi and other technologies using the unlicensed band.

In the legacy 3GPP LTE systems, multiple carriers can be allocated to a multi-carrier capable UEs (User Equipment) in order to boost the data rates (referred to as carrier aggregation). One of the carriers can be referred to as the primary carrier and the other carriers can be referred to as the secondary carriers. The assumption is that the sub-frame boundaries on all the carriers are aligned. The scheduling can be self-carrier based or cross carrier based. In the self-carrier mode, the PDCCH (Physical Downlink Control Channel) for a secondary carrier is sent on the secondary carrier itself; while in cross carrier mode, the resource allocation for all the secondary carriers is contained in the PDCCH that is sent on the primary carrier only. This is further illustrated in FIG. 1. The eNB (eNodeB) configures measurements for a carrier by indicating the carrier frequency index and by assigning gaps for measurement if required (for example if all the RF chains of the UE are already occupied for data transfer on different carriers. The UE performs the measurements based on the assigned gaps (if configured) and then the UE performs averaging as specified which is designed to filter out the short term channel fading and then when a reporting trigger (for example, the averaged measured value becomes greater than a threshold), the UE reports the measurements to the eNB which based on the reported measurements and its load and other parameters, adds a carrier to the UE. The data transfer is then performed on the added carrier in addition to performing data transfer on the already added carriers. When the average measurement for a carrier goes below a threshold, it is removed (de-configured) from the UE. The UE measures the Cell Specific RS, which is sent by eNB in one symbol of every sub-frame. The UE performs one measurement sample every 40 ms and then averages 5 such samples over 200 ms period and then reports the averaged value if the final averaged value meets a configured reporting trigger.

3GPP has started to work on utilizing the unlicensed bands for cellular communication. It has been agreed to add an unlicensed carrier in the legacy carrier aggregation framework of LTE. The unlicensed carrier is assumed to work in a license assisted manner.

The standalone usage of unlicensed carrier is referred to as LTE-U (LTE-Unlicensed). In LTE-U systems, a carrier that is to be added can be an unlicensed carrier. In order to add the unlicensed carrier, it is essential to perform measurements for the unlicensed carriers, as performed in legacy LTE before the addition of a licensed carrier. But in the LTE-U systems, the eNB cannot guarantee when it can occupy the unlicensed channel and hence the UE cannot know when to measure the unlicensed channel.

DISCLOSURE OF INVENTION

Technical Problem

The principal object of the embodiments herein disclose methods and systems for an unlicensed carrier to be added in LTE-U based communication networks by performing measurements for the unlicensed carrier as in legacy LTE for the addition of a licensed carrier, while ensuring that the UE knows when to measure the unlicensed channels.

Solution to Problem

Accordingly the disclosure provides a method for configuring monitoring of an unlicensed channel by a User Equipment (UE) in a wireless communication network, the method comprises monitoring the unlicensed channel by the UE; sending a Reference Signal (RS) on the unlicensed channel by an evolved NodeB (eNB); sending a notification by the eNB on a licensed channel, wherein the notification indicates that the RS was send on the unlicensed channel to the UE; including samples of the RS for averaging by the UE, on receiving the notification from the eNB; and excluding samples of a RS from averaging on the unlicensed channel by the UE, on not receiving the notification from the eNB.

Accordingly the disclosure provides a method for configuring monitoring of an unlicensed channel by a User Equipment (UE) in a wireless communication network, the method comprises sending a notification by an evolved NodeB (eNB) on a licensed channel to the UE, wherein the notification indicates that the eNB has grabbed the unlicensed channel; sending a Reference Signal (RS) on the unlicensed channel by the eNB; and decoding the RS by the UE.

Accordingly the disclosure provides a method for configuring monitoring of an unlicensed channel by a User Equipment (UE) in a wireless communication network, the method comprises sending a notification to the UE by an evolved NodeB (eNB) to start monitoring the unlicensed channel from a first start time for a monitoring duration; monitoring the unlicensed channel by the UE from the first start time for the monitoring duration; sending a Reference Signal (RS) on the unlicensed channel by the eNB after the first start time within the monitoring duration, on the eNB grabbing the unlicensed channel; and decoding the RS by the UE.

Accordingly the disclosure provides a method for configuring monitoring of an unlicensed channel by a User Equipment (UE) in a wireless communication network, the method comprises sending a notification to the UE by an evolved NodeB (eNB) to start monitoring the unlicensed channel from a first start time; monitoring the unlicensed channel by the UE from the first start time; performing Clear Channel Assessment (CCA) by the eNB to grab the unlicensed channel; sending a Reference Signal (RS) on the unlicensed channel by the eNB after the first start time, on the eNB grabbing the unlicensed channel; determining a second start time by the eNB based on Network Allocation Vector (NAV) of transmission ongoing on the unlicensed channel, on the eNB being unable to grab the unlicensed channel; indicating the second start time to the UE by the eNB; sleeping till the second start time by the UE; sending the RS on the unlicensed channel by the eNB after the second start time, on the eNB grabbing the unlicensed channel; and decoding the RS by the UE.

Accordingly the disclosure provides a method for configuring monitoring of an unlicensed channel by a User Equipment (UE) in a wireless communication network, the method comprises configuring a pattern of measurement of a Reference Signal (RS) on the UE by an evolved NodeB (eNB), wherein the pattern comprises of a first start time; a monitoring duration; and periodicity of the duration; monitoring the unlicensed channel by the UE from the first start time for the monitoring duration; sending the RS on the unlicensed channel by the eNB after the first start time within the monitoring duration, if the eNB is able to grab the unlicensed channel during the monitoring duration; and decoding the RS by the UE.

Accordingly the disclosure provides an evolved NodeB (eNB) in a wireless communication network, the eNB configured for configuring a pattern of measurement of a Reference Signal (RS) on a User Equipment (UE); sending the RS on an unlicensed channel, on grabbing the unlicensed channel, wherein the UE is monitoring the unlicensed channel; and sending a notification on a licensed channel, wherein the notification indicates that the RS was send on the unlicensed channel to the UE.

Accordingly the disclosure provides a User Equipment (UE) in a wireless communication network, the UE configured for monitoring an unlicensed channel; including samples of a Reference signal (RS) for averaging, on receiving a notification from an evolved NodeB (eNB) on a licensed channel, that the eNB has grabbed the unlicensed channel and has send the RS on the unlicensed channel; and excluding samples of a RS on the unlicensed channel for averaging, on not receiving the notification from the eNB.

Accordingly the disclosure provides an evolved NodeB (eNB) in a wireless communication network, the eNB configured for configuring a pattern of measurement of a Reference Signal (RS) on a User Equipment (UE); sending a notification on a licensed channel to the UE, wherein the notification indicates that the eNB has grabbed the unlicensed channel; and sending the RS on the unlicensed channel.

Accordingly the disclosure provides a User Equipment (UE) in a wireless communication network, the UE configured for decoding samples of a Reference Signal (RS) received on an unlicensed channel, on receiving a notification from an evolved NodeB (eNB) on a licensed channel that the eNB has grabbed the unlicensed channel.

Accordingly the disclosure provides an evolved NodeB (eNB) in a wireless communication network, the eNB configured for sending a notification to the UE to start monitoring the unlicensed channel from a first start time for a monitoring duration; and sending a Reference Signal (RS) on the unlicensed channel after the first start time within the monitoring duration, on the eNB grabbing the unlicensed channel.

Accordingly the disclosure provides a User Equipment (UE) in a wireless communication network, the UE configured for monitoring the unlicensed channel from a first start time for a monitoring duration; and decoding a Reference Signal (RS) received on the unlicensed channel from an Evolved NodeB (eNB) after the first start time within the monitoring duration, on the eNB grabbing the unlicensed channel.

Accordingly the disclosure provides an evolved NodeB (eNB) in a wireless communication network, the eNB configured for sending a notification to the UE to start monitoring the unlicensed channel from a first start time; performing Clear Channel Assessment (CCA) to grab the unlicensed channel; sending a Reference Signal (RS) on the unlicensed channel after the first start time, on the eNB grabbing the unlicensed channel; determining a second start time based on Network Allocation Vector (NAV) of transmission ongoing on the unlicensed channel, on the eNB being unable to grab the unlicensed channel; indicating the second start time to the UE; and sending the RS on the unlicensed channel after the second start time, on the eNB grabbing the unlicensed channel.

Accordingly the disclosure provides a User Equipment (UE) in a wireless communication network, the UE configured for monitoring an unlicensed channel from a first start time; sleeping till a second start time, on receiving the second start time from the eNB based on Network Allocation Vector (NAV) of transmission ongoing on the unlicensed channel, on the eNB being unable to grab the unlicensed channel; and decoding a Reference Signal (RS) received on the unlicensed channel after the second start time, on the eNB grabbing the unlicensed channel.

Accordingly the disclosure provides an evolved NodeB (eNB) in a wireless communication network, the eNB configured for configuring a pattern of measurement of RS for an unlicensed channel on the UE, wherein the pattern comprises of a first start time; a monitoring duration; and periodicity of the duration; and sending a Reference Signal (RS) on the unlicensed channel after the first start time within the monitoring duration, if the eNB is able to grab the unlicensed channel during the monitoring duration.

Accordingly the disclosure provides a User Equipment (UE) in a wireless communication network, the UE configured for a pattern of measurement of a Reference Signal (RS), wherein the pattern comprises of a first start time; a monitoring duration; and periodicity of the duration and the configuration is received from an evolved NodeB (eNB); monitoring an unlicensed channel from the first start time for the monitoring duration; and decoding the RS received on the unlicensed channel from the eNB after the first start time within the monitoring duration, if the eNB is able to grab the unlicensed channel during the monitoring duration.

Advantageous Effects of Invention

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This disclosure is illustrated in the accompanying drawings, throughout which like reference letters indicate corresponding parts in the various figures. The embodiments herein will be better understood from the following description with reference to the drawings, in which:

FIG. 1 illustrates carrier aggregation in which multiple carriers can be allocated to a multi-carrier capable UE in order to boost the data rates;

FIG. 2 illustrates a communication network comprising of licensed and unlicensed channels, according to embodiments as disclosed herein;

FIG. 3 is a flowchart depicting the process of a eNB using an unlicensed channel for communication, according to embodiments as disclosed herein;

FIG. 4 is a sequence diagram depicting the process of configuring the monitoring of the unlicensed channel by the UE, according to embodiments as disclosed herein;

FIG. 5 is a timing diagram depicting the process of configuring the monitoring of the unlicensed channel by the UE, according to embodiments as disclosed herein;

FIG. 6 is a timing diagram depicting the eNB further extending the monitoring duration in a continuous manner, according to embodiments as disclosed herein;

FIG. 7 is a timing diagram depicting a scenario where the eNB configures a next monitoring duration by specifying a new start time, according to embodiments as disclosed herein;

FIG. 8 is a sequence diagram depicting the method of managing a scenario where the eNB is unable to occupy the indicated unlicensed channel at the indicated start time and the eNB computing a subsequent start time based on the NAV, according to embodiments as disclosed herein;

FIG. 9 is a timing diagram depicting the method of managing a scenario where the eNB is unable to occupy the indicated unlicensed channel at the indicated start time and the eNB computing a subsequent start time based on the NAV, according to embodiments as disclosed herein;

FIG. 10 is a timing diagram depicting the scenario where the eNB provides a subsequent start time, according to embodiments as disclosed herein;

FIG. 11 is a sequence diagram depicting the method of managing a scenario where a pattern of the MRS with respect to time is pre-specified or configured or broadcasted and the eNB informs the UE about the RS after transmission, according to embodiments as disclosed herein;

FIG. 12 is a timing diagram depicting the method of managing a scenario where a pattern of the MRS with respect to time is pre-specified or configured or broadcasted and the eNB informs the UE about the RS after transmission, according to embodiments as disclosed herein;

FIG. 13 is a timing diagram depicting the method of managing a scenario where the RS pattern is broadcasted and UE starts monitoring at start time, according to embodiments as disclosed herein;

FIG. 14 is a timing diagram depicting the method of managing a scenario where the RS pattern is broadcasted and UE starts monitoring on receiving the activation command, according to embodiments as disclosed herein;

FIG. 15 is a timing diagram depicting the method of managing a scenario where the RS pattern is dynamically provided and UE starts monitoring immediately, according to embodiments as disclosed herein;

FIG. 16 is a sequence diagram depicting the method of managing a scenario where the eNB configures the measurement for the unlicensed carrier and then subsequently sends an indication (Channel Occupied Indication) that indicates that the eNB has actually occupied the unlicensed channel (after it has performed CCA and has grabbed the channel), according to embodiments as disclosed herein;

FIG. 17 is a timing diagram depicting the method of managing a scenario where the eNB configures the measurement for the unlicensed carrier and then subsequently sends an indication (Channel Occupied Indication) that indicates that the eNB has actually occupied the unlicensed channel (after it has performed CCA and has grabbed the channel), according to embodiments as disclosed herein;

FIG. 18 is a timing diagram depicting the method of managing a scenario where the RS pattern is provided dynamically, according to embodiments as disclosed herein;

FIG. 19 is a timing diagram depicting the process of configuring monitoring of an unlicensed channel by a User Equipment (UE) in a wireless communication network;

FIG. 20 illustrates a configuration of a UE according to an embodiment of the present disclosure; and FIG. 21 illustrates a configuration of an eNB according to an embodiment of the present disclosure.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The embodiments herein achieve methods and systems for an unlicensed carrier to be added in LTE-U based communication networks by performing measurements for the unlicensed carrier as in legacy LTE for the addition of a licensed carrier, while ensuring that the UE knows when to measure the unlicensed channels. Referring now to the drawings, and more particularly to FIGS. 2 through 19, where similar reference characters denote corresponding features consistently throughout the figures, there are shown preferred embodiments.

FIG. 2 illustrates a communication network comprising of licensed and unlicensed channels, according to embodiments as disclosed herein. The communication network, as depicted, comprises of an evolved NodeB (eNodeB) (eNB) 201 and a plurality of User Equipment (UE) 202. The eNB 201 can be connected to at least one communication network at the back end. The UEs 202 can be at least one of a mobile phone, smart phone, tablet, computer, computing device, wireless dongle, wearable device, or any other device capable of connecting and communicating using the eNB 201.

The eNB 201 can be connected to the UE 202 using at least one licensed channel, wherein the network, to which the eNB 201 belongs, is licensed to use these channels for communication. The eNB 201 can be connected to the UE 202 using at least one unlicensed channel. The eNB 201 can be connected to a plurality of UEs 202, through at least one of the licensed channels and the unlicensed channels.

FIG. 3 is a flowchart depicting the process of an eNB using an unlicensed channel for communication, according to embodiments as disclosed herein. The eNB 201 can scan for unlicensed channels. The eNB 201 can scan on a long-term basis, wherein the duration of scanning can be in terms of 100s of milliseconds. On detecting the presence of unlicensed channels by scanning, the eNB 201 selects (301) at least one unlicensed channel that the eNB 201 can use for communication. The eNB 201 can select the unlicensed channel based on measurement of a plurality of factors such as channel occupancy rate, average interference level, average interference level when the channel is occupied (when the channel is occupied by at least one entity such as the eNB 201, other eNBs, Wi-Fi nodes, and so on), and so on. The average interference level can comprise of interference levels caused by other eNBs, Wi-Fi nodes, and other technologies that operate in the same frequency channel. The eNB 201 informs (302) the UE 202 of the selected unlicensed channels to be monitored. The eNB 201 can inform the UE 202 of the selected unlicensed channels using the licensed channel that provides a connection between the eNB 201 and the UE 202. The eNB 201 can inform all UEs 202 connected to the eNB 201. The eNB 201 can inform a sub-set of UEs 202 from all the UEs 202 that are connected to the eNB 201. The eNB 210 can select the UEs 202 based on at least one parameter such as service type, Received Signal Strength Indication (RSSI), speed/bandwidth of the connection between the UE 202 and the eNB 201, the load on the eNB, and so on.

The eNB 201 further configures (303) the UE 202, parameters related to the measurements to be made by the UE 202. The configured parameters can comprise of the type of measurements to be made, the measurement configuration, and so on. The type of measurements to be made can be of two types: a first type (which measures the interference/activity as seen by the UE from the non-intended transmitter based on parameters such as channel occupancy rate, average interference level, average interference level when occupied and so on) and a second type (which depicts how well the transmission from the intended transmitter (eNB 201) is received by the UE 202). The measurement configuration can comprise of parameters to be measured such as which carrier(s)/signal(s) are to be measured, when the carrier(s)/signal(s) are to be measured, single-carrier (indicating implicit gaps), multi-carrier (which indicated which carriers are to be used as gaps), and so on. The carrier(s)/signal(s) can be a legacy Reference Signal (RS) such as Cell-specific RS (CRS), Primary Synchronization Signal (PSS), Secondary Synchronization Signal (SSS), and so on. In an embodiment herein, the timings of the legacy RS can be redefined. For example, the PSS and the SSS can be transmitted continuously, with five repetitions of PSS followed by five repetitions of SSS. In an embodiment herein, the RS can be a CRS or a Monitoring RS (MRS), if the eNB 201 is using the unlicensed channel for communicating with another UE. The eNB 201 can further inform of the pattern of CSR/MRS monitoring to the UE 202. The carrier(s)/ signal(s) can be a RS such as a Downlink Reference Signal (DRS), and so on. The frequency resources that carry the RS can be pre-specified (sub carriers, resource elements and so on). The eNB 201 can inform the UE 202 to monitor the channel from a specified time for a specific duration. The eNB 201 can inform the UE 202 to monitor the channel using a pseudo-deterministic method based on the pattern of the MRS. The eNB 201 can inform the UE 202 an opportunistic approximate timing on when to monitor the channel. The eNB 201 can inform the UE 202 using the licensed channel to monitor the unlicensed channel, on the eNB 201 gaining control of the unlicensed channel. The eNB 201 can inform the UE 202 using the licensed channel that the eNB 201 send at least one RS on the unlicensed channel, after the eNB 201 has transmitted the RS on the unlicensed channel (considering that the UE 202 was already monitoring the unlicensed channel).

The UE 202 performs (304) channel measurements. The channel measurements can be long-term measurements. The channel measurements can comprise of the received signal level of the RS, the interference levels, channel occupancy rates, average interference levels, average interference level when the channel is occupied, and so on. The UE 202 can stop monitoring once a pre-defined minimum number of valid RSs have been sampled; wherein valid RSs are RSs taken in the subframes in the RS was actually transmitted. The UE 202 further reports (305) the channel measurements to the eNB 201 using the licensed channel. The UE 202 can report the channel measurements to the eNB 201 at pre-defined periodic intervals. An event can trigger the UE 202 into reporting the channel measurements to the eNB 201. The event can be based on pre-defined thresholds that will enable exclusion of measurements of negative channels. The UE 202 can report the channel measurements, after the UE 202 has measured a pre-defined number of samples of RSs. The UE 202 can report the measurement reports to the eNB 201, if at least one of the following conditions is satisfied:

If the licensed carrier Receive Signal Receive Strength/Receive Signal Receive Quality (RSSP/RSRQ) is greater than a threshold, If the unlicensed carrier Receive Signal Receive Power/Receive Signal Receive Quality (RSRP/RSRQ) is greater than a threshold, If the unlicensed carrier interference is lower than a threshold, If the licensed carrier RSRS/RSRQ is greater than a threshold, the unlicensed carrier RSRP/RSRQ is greater than a threshold, and the unlicensed carrier interference is lower than a threshold, If the licensed carrier RSRS/RSRQ is greater than a threshold and the unlicensed carrier RSRP/RSRQ is greater than a threshold.

The UE 202 reports the measurement reports, only if the licensed channel is active, irrespective of the state of the unlicensed channel. The eNB 201 adds (306) unlicensed channel(s) per UE 202, wherein the UE 202 can use these added channels for communication with the eNB 201. The added channels can be selected based on short-term measurements from the UE 202. The eNB 201 can indicate the added channel in advance with a start time, using the licensed channel. The eNB 201 can indicate the subsequent start time for the first added channel. The eNB 201 can indicate to the UE 202 to keep monitoring till a maximum duration, or a deactivation command is received (whichever is earlier). In an embodiment herein, the eNB 201 can preserve the channel until the start of data on that channel(s) and can further transmit RS continuously on that channel till the start of data.

The various actions in method 300 may be performed in the order presented, in a different order or simultaneously. Further, in some embodiments, some actions listed in FIG. 3 may be omitted.

FIG. 4 is a sequence diagram depicting the process of configuring the monitoring of the unlicensed channel by the UE, according to embodiments as disclosed herein. The eNB 201 notifies the UE 202 to monitor the channel Ci for a RS. The eNB 201 can indicate the center frequency of the channel Ci. In an embodiment, the eNB 201 can notify of a plurality of unlicensed channels. Further if multiple carriers are already configured on the UE 202, then the eNB 201 can also notify which channels will be considered as gaps for measuring the indicated channel Ci. The measurement configuration can also include the identity of the MRS that is to be measured. Alternatively, the identity of the MRS can be broadcasted. In an embodiment herein, the eNB 201 can notify the UE 202 to monitor the carrier from a start time 'T'. The start time 'T' can be in terms of units of subframes or frames. In an embodiment herein, the eNB 201 can notify the UE 202 to monitor the channel immediately, on the UE 202 receiving the notification. The UE 202 starts monitoring the channel Ci at time 'T'.

The eNB 201 performs Clear Channel Assessment (CCA) in an attempt to occupy the channel Ci, before time 'T'. If the eNB 201 is able to occupy the channel Ci before or at time 'T', the eNB 201 sends the MRS on the channel Ci. If the eNB 201 is unable to occupy the channel Ci, the eNB 201 notifies the UE 202 to monitor Ci for duration 'D'. The eNB 201 can pre-configure the duration 'D' using a suitable means such as broadcasting or unicasting the duration 'D'. The eNB 201 can send the duration 'D' along with the notification to monitor the channel Ci. The UE 202 continues monitoring the channel Ci for time duration 'D'. In an embodiment herein, the UE 202 continues monitoring the channel Ci for duration 'D' automatically, without receiving a notification from the eNB 201 and the duration 'D' has already been configured at the UE 202. In an embodiment herein, the duration 'D' can depend on the RS pattern periodicity. In an example, the minimum monitoring duration 'D' can be 1 sub-frame. The eNB 201 attempts to occupy the channel Ci by continuing to perform CCA, during the duration 'D'. The above-mentioned process is further depicted in FIG. 5.

If the eNB 201 occupies the channel Ci, the eNB 201 sends the RS on the channel Ci. The UE 202 receives and decodes the RS received on the channel Ci. The UE 202 prepares the measurement report and sends the measurement report to the eNB 201.

In an embodiment herein, the eNB 201 can indicate to the UE 202 using the licensed channel, the exact time when the eNB 201 has transmitted the RS. The eNB 201 can provide the indication to the UE 202 after the end of the duration 'D'. The eNB 201 can provide the indication after transmitting the RS, even before the end of the duration 'D'. The UE 202 on receipt of this indication can consider the measurement as valid or invalid depending on the indication sent by the eNB 201. If the eNB 201 indicated that the eNB 201 had actually transmitted the MRS, then the UE 202 considers it as a valid measurement sample, else it does not. In an embodiment herein, the eNB 201 can also indicate in one shot when it had sent the MRS over a period of time.

In an embodiment, if the eNB 201 was not able to capture the channel then it sends an indication to the UE 202; else it is assumed that the eNB 201 has captured the channel at the indicated MRS opportunities. This indication can be sent as a MAC level CE or as a PHY level information element for example in PDCCH, using the licensed channel. Alternatively, this indication can be a bitmap representing the actual transmission status of the previous MRS opportunities per channel.

In an embodiment, if the eNB 201 was not able to transmit sufficient number of RS in the duration 'D', then the eNB 201 can extend the monitoring duration by indicating the amount of extension or just extending by the default configured or pre-specified maximum monitoring duration. This is further illustrated in FIG. 6.

In an embodiment, if the eNB 201 was not able to transmit sufficient number of RS in the duration 'D', then the eNB 201 can further extend the monitoring duration by indicating a Start Time "T1" prior to the expiry of the monitoring duration. This is illustrated in FIG. 7.

FIG. 8 is a sequence diagram depicting the method of managing a scenario where the eNB is unable to occupy the indicated unlicensed channel at the indicated start time and the eNB computing a subsequent start time based on the NAV. The eNB 201 notifies the UE 202 to monitor the channel Ci for a RS. The eNB 201 can indicate the center frequency of the channel Ci. In an embodiment, the eNB 201 can notify of a plurality of unlicensed channels. Further if multiple carriers are already configured on the UE 202, then the eNB 201 can also notify which channels will be considered as gaps for measuring the indicated channel Ci. The measurement configuration can also include the identity of the MRS that is to be measured. Alternatively, the identity of the MRS can be broadcasted. In an embodiment herein, the eNB 201 can notify the UE 202 to monitor the carrier from a start time 'T'. The start time 'T' can be in terms of units of subframes or frames. In an embodiment herein, the eNB 201 can notify the UE 202 to monitor the channel immediately, on the UE 202 receiving the notification. The UE 202 starts monitoring the channel Ci at time 'T'.

The eNB 201 performs Clear Channel Assessment (CCA) in an attempt to occupy the channel Ci, before time 'T'. If the eNB 201 is able to occupy the channel Ci before or at time 'T', the eNB 201 sends the MRS on the channel Ci. If the eNB 201 is unable to occupy the channel Ci, the eNB 201 detects the Network Allocation Vector (NAV) of the ongoing transmission. The eNB 201 checks if Ci will be busy at time 'T' by determining the length of the ongoing transmission using the NAV. If Ci will be busy at time 'T', the eNB 201 determines a new time 'T1', wherein the UE 202 can start monitoring Ci from time 'T1'. The eNB 201 can determine time 'T1' as $$T1 = (\text{starting time of transmission} + NAV) - T$$

The eNB 201 can then perform CCA prior to T1. If the eNB 201 gets the Ci, the eNB 201 transmits the MRS and the UE 202 can consequently measure the desired MRS. If it doesn't gets the channel as a result of CCA (for example, some other node has occupied the channel) then it gives a new Start Time to the UE or can send an indication for extending the monitoring duration for monitoring the unlicensed channel for measurement of MRS. The above mentioned process is further depicted in FIG. 9.

If the eNB 201 occupies the channel Ci, the eNB 201 sends the RS on the channel Ci. The UE 202 receives and decodes the RS received on the channel Ci. The UE 202 prepares the measurement report and sends the measurement report to the eNB 201.

In an embodiment herein, the eNB 201 can indicate to the UE 202 using the licensed channel, the exact time when the eNB 201 has transmitted the RS. The eNB 201 can provide the indication to the UE 202 after the end of the duration 'D'. The eNB 201 can provide the indication after transmitting the RS, even before the end of the duration 'D'. The UE 202 on receipt of this indication can consider the measurement as valid or invalid depending on the indication sent by the eNB 201. If the eNB 201 indicated that the eNB 201 had actually transmitted the MRS, then the UE 202 considers it as a valid measurement sample, else it does not. In an embodiment herein, the eNB 201 can also indicate in one shot when it had sent the MRS over a period of time.

In an embodiment, if the eNB 201 was not able to send sufficient number of RS, then the eNB 201 can keep giving subsequent start times sequentially in the preceding start time. For example, first the eNB 201 indicates a start time "T", but the eNB 201 was not able to get the channel at "T". The eNB 201 then indicated a subsequent start time "T1". At "T1", the eNB 201 was again not able to get the channel so it indicated a further subsequent start time "T2". The eNB 201 can keep indicating the sequential subsequent start times until the required number of RS are transmitted for example the minimum number of RS samples required for reliable averaging. This is further illustrated in FIG. 10.

FIG. 11 is a sequence diagram depicting the method of managing a scenario where a pattern of the MRS with respect to time is pre-specified or configured or broadcasted and the eNB informs the UE about the RS after transmission. The eNB 201 can send the RS pattern and a start time to the to the UE 202, using the licensed channel. The RS pattern can be based on subframe numbering (for example, PSS, SSS, CRS or a new RS). In an example, the RS pattern can be transmitted every 5 ms at an indicated subframe number (Nmodule5==5, where N is the subframe number). The eNB 201 can broadcast the RS pattern (as depicted in FIG. 13). The eNB 201 can also prespecify the RS pattern. In an embodiment herein, the eNB 201 can alter the pattern, for every measurement configuration. In an example, the eNB can dynamically have the RS in non-overlapping configurations based on inter cell interference. If there is no change from the previously used RS pattern, the eNB 201 can send the start time only to the UE 202. The eNB 201 communicates the RS pattern and the start time to the UE 202. The eNB 201 can also communicate a maximum monitoring duration (measurement window) during which the UE 202 can attempt to decode as many RS as possible. In an embodiment herein, the eNB 201 can communicate a minimum number of valid samples of the RS, which the UE 202 has to decode, to the UE 202.

The eNB 201 performs CCA continuously, before the UE 202 starts monitoring Ci. If the eNB 201 is unable to grab the Ci, the eNB 201 sends a notification that the eNB 201 was unable to grab the Ci using the licensed channel. The UE 202 can then ignore the measurement samples made of the RS. If the eNB 201 was able to grab the Ci, the eNB 201 transmits the RS on the Ci. The eNB 201 can transmit the RS, anytime before the measurement occasion gets lapsed. The eNB 201 further sends a notification to the UE 202 that the eNB 201 has transmitted the RS on the Ci, using the licensed channel, after the monitoring occasion is completed. The UE 202 accordingly includes the RS samples. The UE 202 averages the RS samples. The UE 202 then prepares the measurement report and sends the measurement report to the eNB 201. The above process is depicted in the timing diagram in FIG. 12.

In an embodiment herein, the eNB 210 can broadcast or pre-specify the RS pattern. The eNB 201 can send a notification activating the RS monitoring in the UE 202, at a later point in time, using the licensed channel. In an example, the eNB 201 can send the activation notification in the configuration itself. This is depicted in FIG. 14. In another example, the UE 202 can activate the RS monitoring by default, on receiving the RS configuration. This is depicted in FIG. 15. This can be activated using at least one of a MAC (Media Access Control) activation/de-activation control element, RRS signaling (implicitly in measurement configuration), legacy ON/OFF indication mechanism, and so on. Similarly, the eNB 201 can send a notification deactivating the RS monitoring in the UE 202, using the licensed channel. The indication from activation/deactivation can be per unlicensed channel.

In an embodiment, the configuration of the MRS can be activated by default. In this case no specific signaling of the indication for activation is required.

In one example, the start time can be considered as immediate and hence the start time is not required to be given in the measurement configuration. This is illustrated in FIG. 15.

FIG. 16 is a sequence diagram depicting the method of managing a scenario where the eNB configures the measurement for the unlicensed carrier and then subsequently sends an indication (Channel Occupied Indication) that indicates that the eNB has actually occupied the unlicensed channel (after it has performed CCA and has grabbed the channel), according to embodiments as disclosed herein. The eNB 201 can send measurement configuration comprising of the RS pattern to the UE 202, using the licensed channel. The RS pattern can be based on subframe numbering (for example, PSS, SSS, CRS or a new RS). In an example, the RS pattern can be transmitted every 5 ms at an indicated subframe number (Nmodule5=5, where N is the subframe number). The eNB 201 can broadcast the RS pattern. The eNB 201 can also prespecify the RS pattern. In an embodiment herein, the eNB 201 can alter the pattern, for every measurement configuration. In an example, the eNB can dynamically have the RS in non-overlapping configurations based on inter cell interference.

The eNB 201 performs CCA continuously after sending the measurement configuration to the UE 202. If the eNB 201 is able to grab the Ci, the eNB 201 sends a notification to the UE 202 on the licensed channel that the eNB 201 has occupied Ci (channel occupied indication). The UE 202 monitors the Ci for a single scheduling period (up to a pre-defined maximum channel occupancy time). This notification can be sent using a suitable means such as MAC activate/deactivate bitmap CE, PHY layer signaling, and so on. The eNB 201 then transmits the RS on the Ci. The UE 202 accordingly decodes the RS samples. The UE 202 averages the RS samples. The UE 202 then prepares the measurement report and sends the measurement report to the eNB 201. The above process is depicted in the timing diagram in FIG. 17.

In an embodiment herein, the eNB 201 does not send the RS pattern initially, but sends the RS pattern and the channel activation message with the notification to the UE 202 on the licensed channel that the eNB 201 has occupied Ci. This can be useful for sending multiple RS in the Channel Occupancy time according to current environment conditions (bursty measurement RS, and so on). The UE 202 can start CRS/ Monitoring RS in the first subframe when the eNB 201 occupies the channel. This is depicted in FIG. 18.

FIG. 19 is a timing diagram depicting the process of configuring monitoring of an unlicensed channel by a User Equipment (UE) in a wireless communication network. FIG. 19 depicts an eNB 201 sending a pattern of measurement of a Reference Signal (RS) to the UE 201, using the licensed channel. The pattern of measurement can comprise of a first start time; a monitoring duration; and periodicity of the monitoring duration. The UE 202 starts monitoring the unlicensed channel Ci from the first start time for the monitoring duration, as indicated in the pattern of measurement. The eNB 201 attempts to grab the unlicensed channel Ci by performing CCA. If the eNB 201 is able to grab the unlicensed channel Ci, the eNB 201 sends the RS on the unlicensed channel after the first start time within the monitoring duration. The UE 202 accordingly decodes the RS samples. The UE 202 averages the RS samples. The UE 202 then prepares the measurement report and sends the measurement report to the eNB 201.

Embodiments herein use the terms 'channel' and 'carrier' interchangeably and refer to a licensed or unlicensed media, which enables the eNB 201 to communicate with at least one UE 202.

Embodiments herein disclose use of a configured monitoring duration 'D' to enable the UE 202 to reduce power consumption, else the UE 202 will consume additional power if monitoring Ci for an unspecified duration.

The embodiments disclosed herein can be implemented through at least one software program running on at least one hardware device and performing network management functions to control the elements. The elements shown in FIG. 1 can be at least one of a hardware device, or a combination of hardware device and software module.

FIG. 20 illustrates a configuration of a UE according to an embodiment of the present disclosure.

Referring to FIG. 20, a UE 2000 may include a transceiver 2005 for performing signal transmission/reception with an eNB, and a controller 2010 for controlling all operations of the UE 2000. In the first to third methods of the present disclosure, the operations described as UE's operations among the above-described operations may be construed to be performed under control of the controller 2010.

The controller 2010 and the transceiver 2005 should not necessarily be configured as separate components, and may be implemented as one component in the form of a single chip.

FIG. 21 illustrates a configuration of an eNB according to an embodiment of the present disclosure.

Referring to FIG. 21, an eNB 2100 may include a transceiver 2105 for performing signal transmission/reception with a UE and other entities of the network, and a controller 2110 for controlling all operations of the eNB 2100. In the first to third methods of the present disclosure, the operations described as eNB's operations among the above-described operations may be construed to be performed under control of the controller 2110.

The controller 2110 and the transceiver 2105 should not necessarily be configured as separate components, and may be implemented as one component in the form of a single chip.

It should be noted that examples of the configuration and methods of the LTE-U system, which are illustrated in FIGS. 1 to 21, are not intended to limit the scope of the present disclosure. In other words, all components or operations described in FIGS. 1 to 21 should not be construed as prerequisites for implementation of the present disclosure, and the present disclosure may be implemented by only some of the components without departing from the scope of the present disclosure.

The above-described operations may be implemented by mounting a memory device storing the relevant program code in an entity of a communication system, a function, an eNB, or any component of a UE. In other words, a controller in the entity, the function, the eNB or the UE may read the program code stored in the memory device and execute the read program code by a processor or a central processing unit (CPU), to perform the above-described operations.

Above-described various components and modules of the entity, the function, the eNB or the UE may be operated using a hardware circuit (e.g., complementary metal oxide semiconductor (CMOS)-based logic circuit), firmware, software and/or a combination of hardware, firmware and/or software embedded in a machine-readable medium. For example, various electrical structures and methods may be implemented using transistors, logic gates and electrical circuits, such as an application-specific integrated circuit (ASIC).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for monitoring of an unlicensed channel by a user equipment (UE) in a wireless communication network, the method comprising:
 receiving, by the UE, a measurement configuration including a start time, a duration, and a periodicity of a measurement window on a licensed channel;
 monitoring, by the UE, the unlicensed channel based on the measurement configuration;
 receiving, by the UE, a reference signal (RS) on the unlicensed channel from a base station (BS) within the measurement window; and
 measuring, by the UE, the unlicensed channel based on the RS,
 wherein the RS is at least one of cell-specific RS (CRS), primary synchronization signal (PSS) or secondary synchronization signal (SSS), and
 wherein, if the unlicensed channel is not occupied by the BS before end of the measurement window, the measurement window is extended and a next measurement window is configured by indicating a second start time to the UE.

2. The method of claim 1, further comprising:
 measuring, by the UE, parameters from samples the RS, the parameters including channel occupancy rate, average interference level, and average interference level when the unlicensed channel is occupied;
 creating, by the UE, a measurement report based on the measured parameters; and
 transmitting, by the UE, the measurement report to the BS, and
 wherein the measurement report is transmitted based on at least one of an event trigger and a periodic trigger, the event trigger being at least one of:
  if a pre-configured number of the samples of the RS have been measured;
  if receive signal receive strength/receive signal receive quality (RSSP/RSRQ) of the licensed channel is greater than a first threshold;
  if RSRP/RSRQ of the unlicensed channel is greater than a second threshold;
  if interference on the unlicensed channel is lower than a third threshold;
  if the RSSP/RSRQ of the licensed channel is greater than the first threshold; the RSRP/RSRQ of the unlicensed channel is greater than the second threshold; and the interference on the unlicensed channel is lower than the third threshold; and
  if the RSSP/RSRQ of the licensed channel is greater than the first threshold and the RSRP/RSRQ of the unlicensed channel is greater than the second threshold.

3. A method for configuring an unlicensed channel by a base station (BS) in a wireless communication network, the method comprising:
 transmitting, by the BS, a measurement configuration including a start time, a duration, and a periodicity of a measurement window to a user equipment (UE) on a licensed channel; and
 transmitting, by the BS, a reference signal (RS) on the unlicensed channel to the UE within the measurement window,
 wherein the RS is at least one of cell-specific RS (CRS), primary synchronization signal (PSS) or secondary synchronization signal (SSS), and
 wherein, if the unlicensed channel is not occupied by the BS before end of the measurement window, the measurement window is extended and a next measurement window is configured by indicating a second start time to the UE.

4. A user equipment (UE) for monitoring of an unlicensed channel in a wireless communication network, the UE comprising:
 a transceiver configured to:
  receive a measurement configuration including a start time, a duration, and a periodicity of a measurement window on a licensed channel,
  monitor the unlicensed channel based on the measurement configuration, and
  receive a reference signal (RS) on the unlicensed channel from a base station (BS) within the measurement window; and
 a controller configured to measure the unlicensed channel based on the RS,
 wherein the RS is at least one of cell-specific RS (CRS), primary synchronization signal (PSS) or secondary synchronization signal (SSS), and
 wherein, if the unlicensed channel is not occupied by the BS before end of the measurement window, the measurement window is extended and a next measurement window is configured by indicating a second start time to the UE.

5. The UE of claim 4, wherein the controller is further configured to measure parameters from samples the RS, the parameters including channel occupancy rate, average interference level, and average interference level when the unlicensed channel is occupied, create a measurement report based on the measured parameters, and transmit the measurement report to the BS, and
wherein the measurement report is transmitted based on at least one of an event trigger and a periodic trigger, the event trigger being at least one of:
if a pre-configured number of the samples of the RS have been measured;
if receive signal receive strength/receive signal receive quality (RSSP/RSRQ) of the licensed channel is greater than a first threshold;
if RSRP/RSRQ of the unlicensed channel is greater than a second threshold;
if interference on the unlicensed channel is lower than a third threshold;
if the RSSP/RSRQ of the licensed channel is greater than the first threshold; the RSRP/RSRQ of the unlicensed channel is greater than the second threshold; and the interference on the unlicensed channel is lower than the third threshold; and
if the RSSP/RSRQ of the licensed channel is greater than the first threshold and the RSRP/RSRQ of the unlicensed channel is greater than the second threshold.

6. A base station (BS) for configuring an unlicensed channel in a wireless communication network, the BS comprising:
a transceiver configured to:
transmit a measurement configuration including a start time, a duration, and a periodicity of a measurement window on a licensed channel to a user equipment (UE), and
transmit a reference signal (RS) on the unlicensed channel to the UE within the measurement window,
wherein the RS is at least one of cell-specific RS (CRS), primary synchronization signal (PSS) or secondary synchronization signal (SSS), and
wherein, if the unlicensed channel is not occupied by the BS before end of the measurement window, the measurement window is extended and a next measurement window is configured by indicating a second start time to the UE.

* * * * *